United States Patent Office 3,247,401
Patented Apr. 19, 1966

3,247,401
REMOTE CONTROL APPARATUS FOR CONTROLLING A WORKING CYCLE OF HYDRAULIC PISTONS
Mladen Mazuranic-Jankovic, 11 Rue de Beaumont, Geneva, Switzerland
Filed Jan. 21, 1963, Ser. No. 252,899
Claims priority, application Switzerland, Mar. 22, 1962, 3,428/62
7 Claims. (Cl. 307—113)

Various means are known, for controlling operative parts actuating various mechanical or electric elements with a view to executing a cycle of operations or of movements to be performed in accordance with a predetermined program. Such means include generally a memory constituted for instance by a cam or a perforated strip, the execution of which and the reading of the record carried require comparatively intricate and costly equipment. Furthermore, this type of memory can serve only for executing well-defined cycles and cannot generally be modified within short notice for satisfying very different requirements. Thus, it is necessary, in the case of prior known arrangements, to provide a large number of corresponding cams or strips if it is desired to execute a number of different cycles of operations without any loss of time.

Such a collection of different memories is comparatively expensive and consequently is not within the reach of small-scale industries, the chief activity of which resides precisely in the execution of a comparatively unimportant number of different control operations, each of which requires for its execution a special program.

The present invention has for its object an arrangement for controlling a group of operative parts, in particular parts adapted to execute in succession the different stages of a predetermined cycle, while eliminating the above-mentioned drawbacks.

The arrangement according to the invention includes at least as many rods or the like elongated members as there are operative stages to be executed. The rods are adapted to be shifted longitudinally between two extreme positions in one predetermined direction under the action of the electric field produced by at least one energizing winding and in the opposite direction under the action of return means, while further means lock the inoperative rods in one of the extreme positions and release in succession that rod which corresponds to the stage to be executed so that it is shifted back into its other extreme position by the cooperating return means, at least as many means controlling electrically the movement of a corresponding part as there are parts associated with said rods and subjected to their action so as to become operative when the corresponding rods are in their second position. At least as many switches as there are operative parts are provided. Each of the switches is inserted in the feed circuit of the winding in the electric control means in association with the parts corresponding to the rods. Each switch is designed in a manner such that when the movable section of the corresponding part has executed a predetermined stroke corresponding to the stage of the cycle to be executed, the switch produces a shifting of the released rod towards its first extreme position under the action of the winding, to hold the rod in position through said locking means while releasing the rod corresponding to the following stage so as to allow it to move towards its second extreme position for which the operative part controlling the stage is actuated.

I have illustrated, by way of example in the accompanying drawings, two preferred embodiments of my invention. In said drawings.

Figure 3:
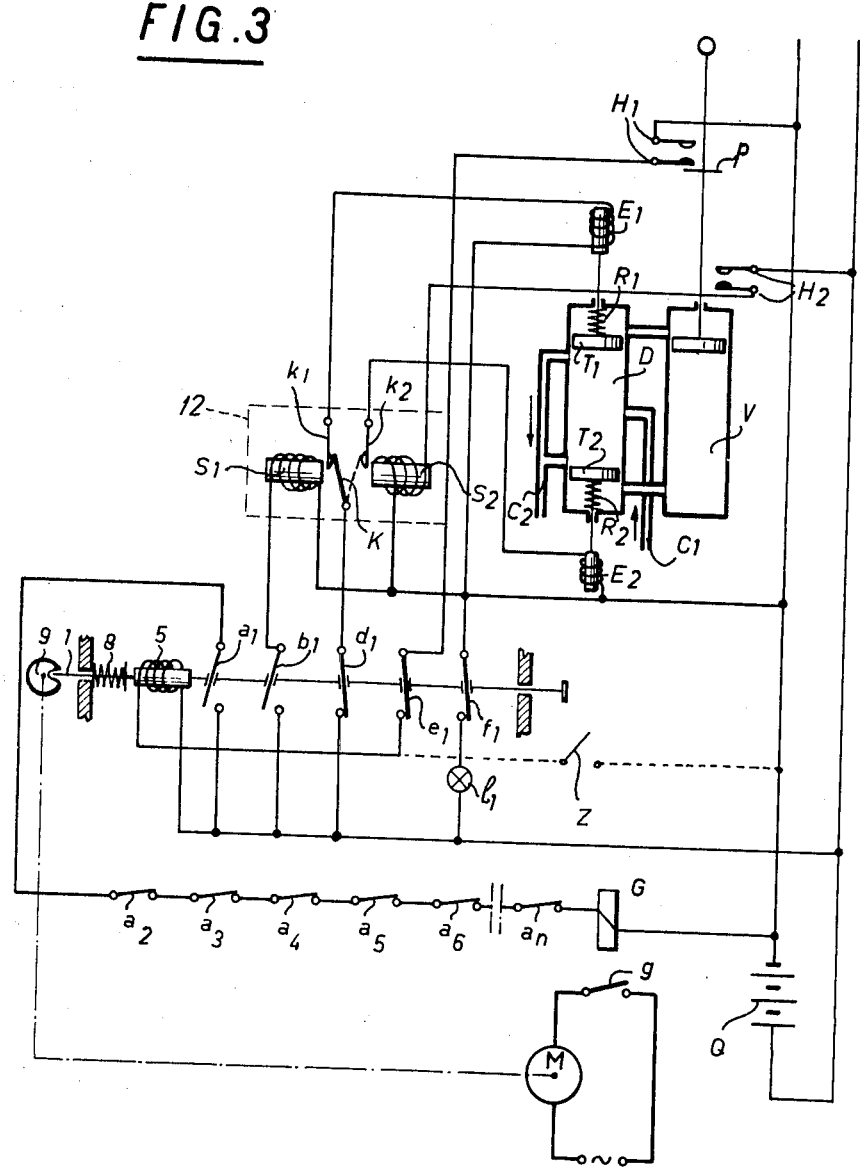
FIG. 3, is a wiring diagram illustrating the operation of the first embodiment in FIG. 1.
Figure 6:
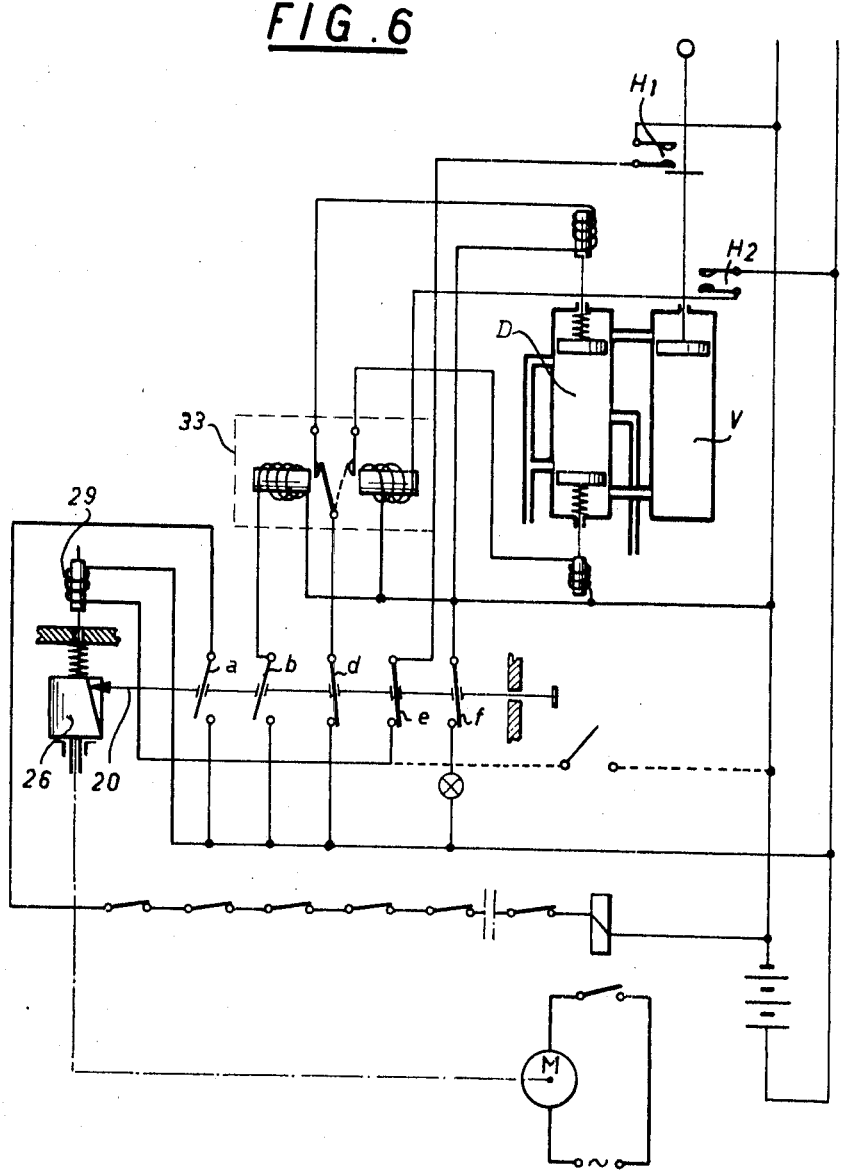
FIG. 6, is a wiring diagram of the embodiment of the invention shown in FIG. 5.

In the embodiments illustrated, the arrangement according to my invention is intended for the control of controlled cycled controlled elements comprising jacks such as hydraulic jacks, as illustrated at V in FIGS. 3 and 6. The jack piston may be connected for instance with the electrical or mechanical members ensuring the execution of the successive stages of a predetermined operative cycle of a machine or of a portion of the machine.

The movement of the piston in the jacks is controlled in a conventional manner as provided by feeding fluid towards either of the transverse surfaces of its piston by means of a distributor D which may be, for instance, of the type illustrated in FIGS. 3 and 6 inside the cylinder of which are fitted two slide valves T1 and T2 which are subjected to the action of the electromagnets E1 and E2 respectively and of the antagonistic springs R1 and R2 respectively biasing the pistons toward each other.

In the drawing, the two electromagnets are illustrated in their deenergized condition, so that the slide valves prevent the oil fed from a channel C1 from entering the cylinder of the jack V and shifting the piston therein. This oil returns then into a container which is not illustrated through the channel C2. When, in contradistinction, one of the electromagnets is energized, for example the electromagnet E1, the slide valve T1 is raised and uncovers the opening of the channel connecting the distributor D with the upper part of the jack V so that the oil pressure acting on the piston in the jack, provides for the downward movement of the latter.

The two embodiments of the arrangement illustrated in the drawings have now for their object to control the operation of the electromagnets associated with the oil distributor for each jack in accordance with a predetermined sequence corresponding to the stage of the cycle each jack is to execute.

Figure 1:
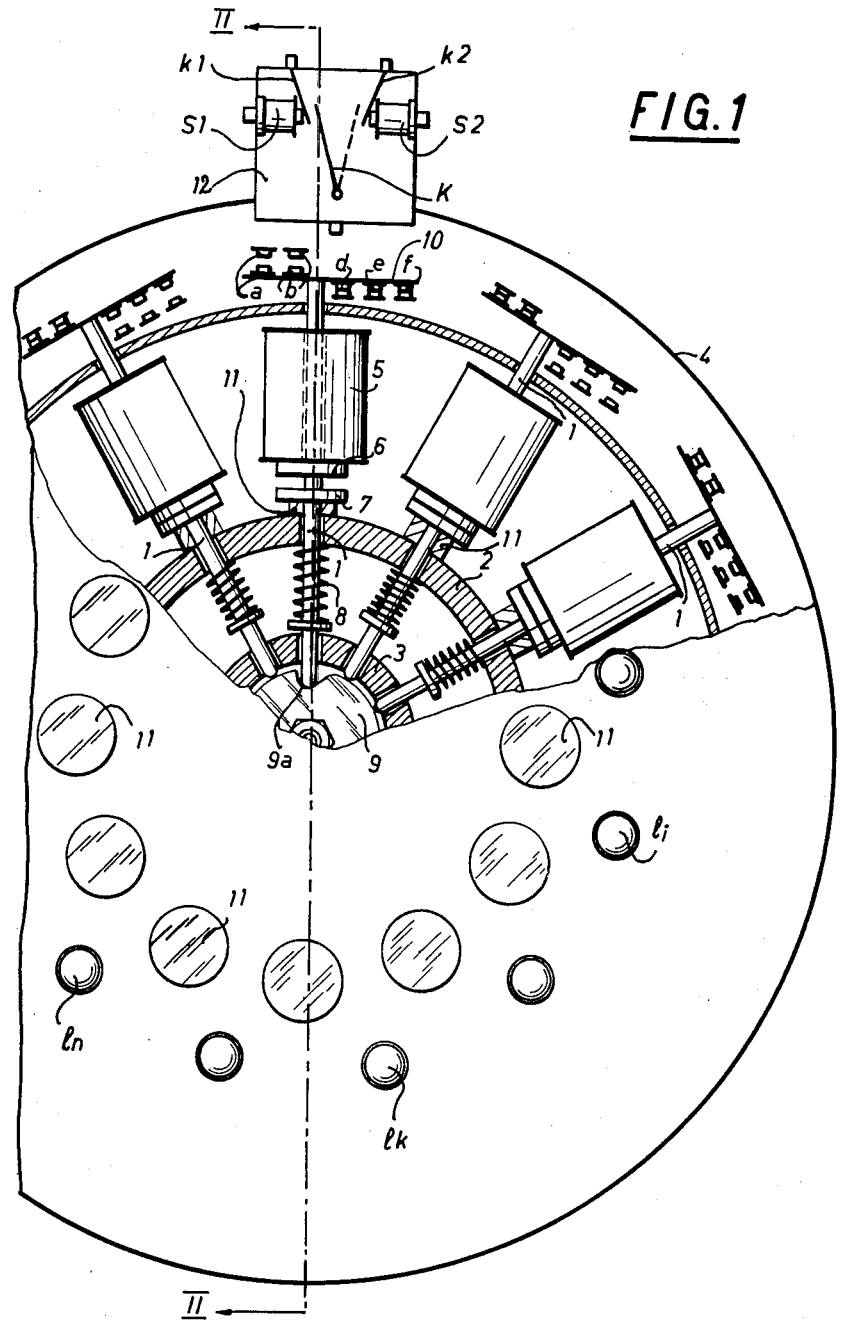
FIG. 1, is a front view partly broken off, of the first embodiment.
Figure 2:
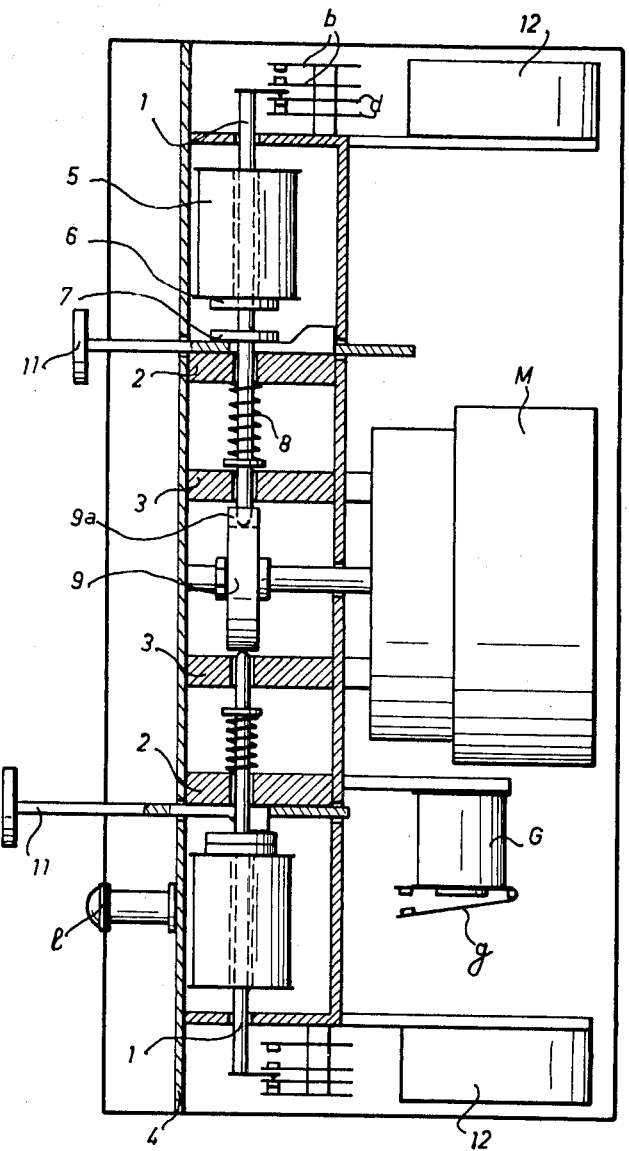
FIG. 2, is a longitudinal cross-section through line II—II of FIG. 1.

In the first embodiment illustrated in FIGS. 1 to 3, the arrangement includes a system of radial control elements comprising rods 1 fitted slidingly in two coaxial sleeves 2 and 3 provided inside a casing 4. Each rod engages an axial bore formed in an electromagnet 5 of which the armature 6 is adapted to act magnetically on a ring 7 rigid with the corresponding rod 1. Each rod is furthermore subjected to the action of a spring 8 urging the rod against the profile edge of a disc-shaped cam 9 coaxial with the sleeves 2 and 3 and coaxially rigid with the shaft of a driving motor M to make it enter into a notch or recess 9a formed in the cam, when the notch is brought into alignment with the rod by the rotation of the motor, as described hereinafter.

The upper end of each rod 1 carries a small plate 10 adapted to act on five pairs of contact-pieces $a, b, d, e, f$. In FIG. 3, the indices for the contact-pieces on the different rods range between 1 and $n$ to correspond with the numeric order of the rod 1 controlling them.

Each rod may furthermore be locked in its raised position for which its inner end near the center of the casing rests on the smooth edge of the cam 9 by a removable push rod 11 illustrated partly cross-sectionally in FIG. 2.

The contact-pieces $a1 \ldots a(n)$ carried by the different rods of the arrangement, are inserted in series with one another in the circuit energizing a relay G controlling through its contact-piece g the starting and stopping of the motor M. The relay G is designed so as to open the contact-piece g when it is no longer energized as a consequence of the opening of any one of the contact-pieces $a1, a(n)$. Thus, as long as one of the rods 1 of the arrangement engages the recess 9a of the cam 9 and consequently its contact-piece a1 is open, the motor M remains stationary and it starts running only when all the rods are in their raised position. The rods are then in contacting relationship with the smooth periphery of the cam 9 and the rod which had previously entered the recess 9a, has been shifted out of the latter through energization of the corresponding electromagnet 5.

The motor stops again as soon as a rod which is not locked by the push rod 11 enters the recess 9a in the cam 9.

With each system of contact-pieces a, b, d, e, f, there is associated a reversing switch box 12 including a rocking arm K adapted to cooperate with the contact-pieces k1 and k2 according as to whether it is shifted towards the first or the second of the contact-pieces under the action of the corresponding electromagnet S1 or S2.

The switch k1 is connected with one terminal of the circuit energizing the electromagnet E1 of which the second terminal is connected directly with the supply of current so that when the arm K cooperates with the contact-piece k1 while the contact-piece d is closed. The latter contact-piece is inserted between the contact-piece k1 (or k2) and the other terminal of the source of current. The slide valve T1 raised by its electromagnet uncovers the upper port feeding the jack V and the piston is then urged in the direction corresponding to the lower end of FIG. 3. The contact-piece k2 is similarly connected with one terminal of the electromagnet E2 controlling the slide valve T2.

The electromagnet S1 is operative when the contact-piece b is closed, that is when the corresponding rod is in its outer extreme position. The electromagnet S2 becomes operative upon closing of a miniature switch H2 by the piston of the jack V reaching the lower end of its stroke as provided by the impact of a stop p carried by said piston engaging said miniature switch.

When the jack piston has reached the uppermost point of its stroke the same stop p closes a further miniature switch H1 which produces, through the contact-piece e, the energization of the electromagnet 5 associated with the corresponding rod and, consequently, the rod is urged out of the recess 9a in the cam 9.

As to the contact-piece f, it is intended when closed for the control of the ignition of a tell-tale lamp l associated with each rod 1, to show thus which rod has actually engaged the notch or recess 9a.

It will be readily understood that the diagram on FIG. 3 shows solely the electric and hydraulic elements controlled by one of the rods 1 with the addition only of the contact-pieces a2 to a(n) controlled by the other rods of the arrangement, which latter contact-pieces have been illustrated solely for a better understanding of the operation of the complete arrangement.

At the moment at which one of the rods 1 drops inside the recess 9a, the position of the different elements of the electric and hydraulic circuits cooperating with said rods is that illustrated in FIG. 3: the motor M is inoperative because the contact-piece a is open, the electromagnet S1 is deenergized but the arm K engages the contact piece k1, so that the electromagnet E1 raises the slide valve T1 against the action of the spring R1, the contact-piece e is closed and the same is the case for the contact-piece f, so that the tell-tale lamp l is ignited.

The entrance of oil into the upper section of the jack V lowers the piston in the latter until the stop meets the miniature switch H2 and closes it. The arm K is then attracted by the electromagnet S2 so as to engage the contact-piece k2, whereby the circuit energizing the electromagnet E2 of the distributor V is closed. The slide valve T1 is then urged back into the position illustrated in the drawing, whereas the slide valve T2 uncovers the opening through which oil is admitted into the cylinder of the jack V. The piston in the jack begins rising and stops only when the stop p closes the miniature switch H1. The latter produces consequently an energization of the electromagnet 5 which leads to an outward movement of the corresponding rod 1 and to the closing of the contact-pieces a and b controlling respectively the rotation of the motor M and the rocking of the arm K into the position illustrated in solid lines in the drawing.

Obviously, the same procedure is obtained with the similar electric and hydraulic elements controlled by the other rods 1 in succession, provided they are not locked by their push-rods 11.

The starting of the arrangement described is performed through a closing of the switch Z inserted in the circuit energizing the electromagnet 5 corresponding to the rod engaging the recess 9a at the end of the last stage of the last cycle executed.

Figure 4:
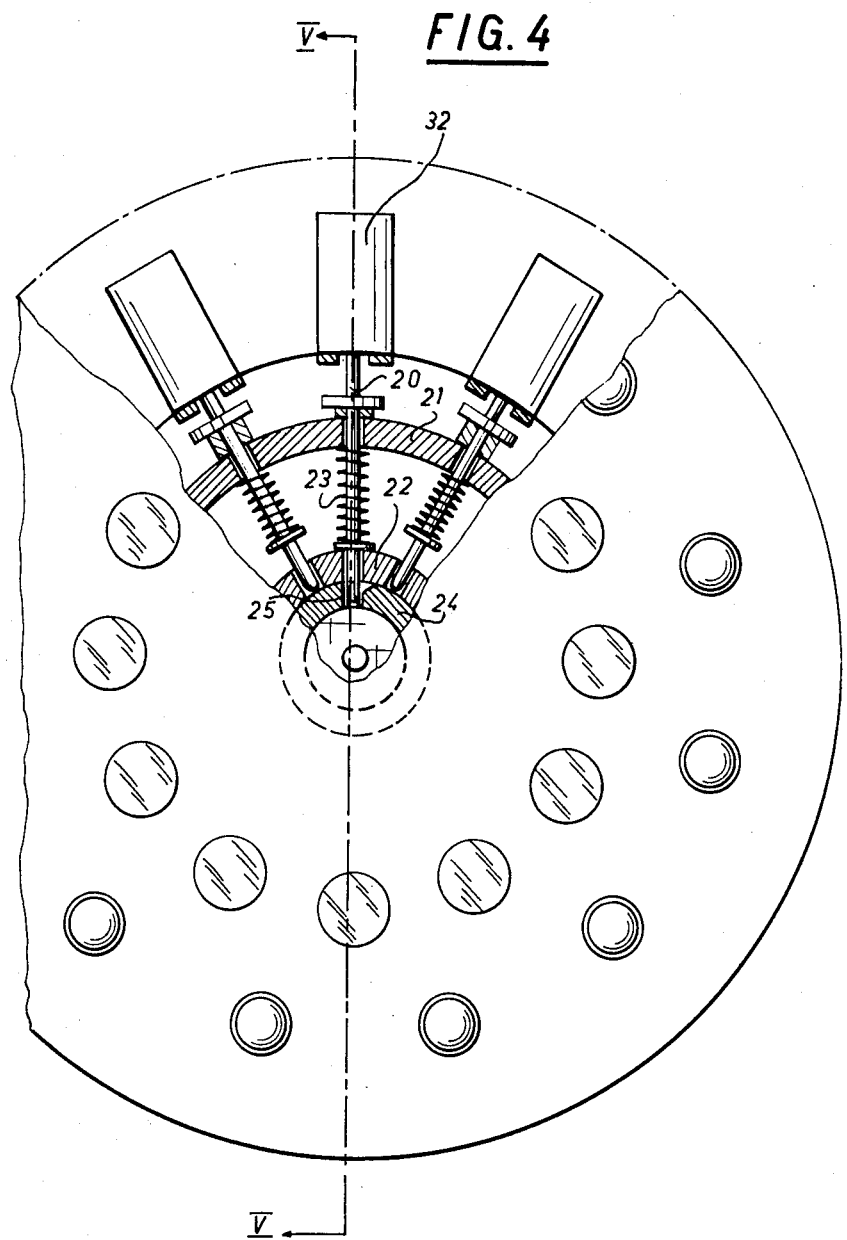
FIG. 4, is a front view partly broken off of the second embodiment.
Figure 5:
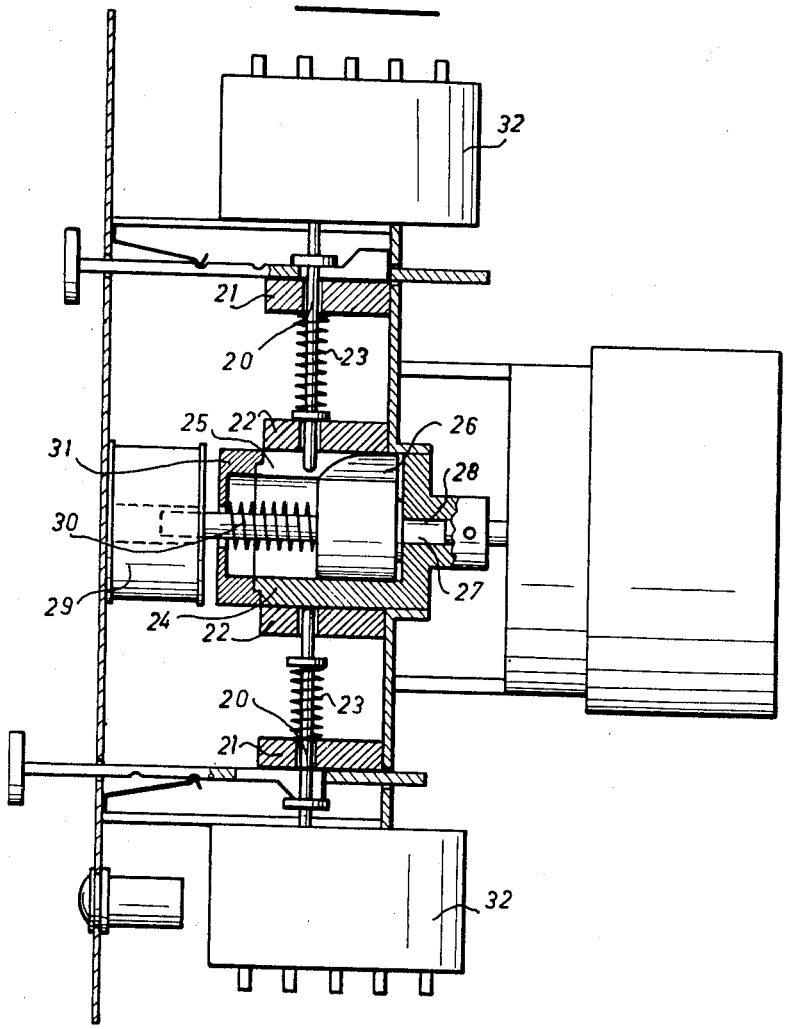
FIG. 5, is a longitudinal cross-section through line V—V of the second embodiment in FIG. 4.

In the second embodiment illustrated in FIGS. 4 to 6, the arrangement includes, in a manner similar to the preceding embodiment, radial rods 20 extending slidingly through the coaxial sleeves 21 and 22 and subjected to the action of springs 23 urging them against the outer periphery of a socket 24 coaxially rigid with the shaft of the driving motor M or engaging, inside the notch or slot 25 formed radially in said socket, that rod which registers with the slot.

Inside the socket 24 may slide longitudinally a cam 26 in unison with a shaft 27 of which one end enters a corresponding housing 28 formed in the bottom of the socket 24, while the opposite end of said shaft engages the opening of an annular electromagnetic winding 29. A spring 30 is wound around the shaft 27 tensioned between the cam 26 and the bottom of a cap 31 fitted over the end of the socket 24.

Each rod 20 controls a group of five contact-pieces a, b, d, e and f housed inside the casing 32 (FIGS. 4 and 5) carrying a switch 33 (FIG. 6) which is quite similar to the switch 12 of the first embodiment described.

The contact-pieces and the switch box are inserted in an electropneumatic circuit illustrated in FIG. 6, which differs from that illustrated in FIG. 3 solely through the means controlling the shifting of the rod 20. In the case illustrated in FIG. 6, control is obtained through the single common electromagnet 29 and the associated cam 26, which electromagnet is energized by the closing of the miniature switch H1 controlled by the jack corresponding to the rod which is to be released with reference to the socket 24. To this end, the miniature switches H1 controlled by the different jacks to be actuated are all connected with one of the terminals of the electromagnetic winding 29 through the contact-pieces e of the corresponding rods 20.

The arrangement described and illustrated shows the advantage of being of a comparatively low cost price, of a reliable operation and of a very easy control. It is sufficient, as a matter of fact, with a view to obtaining a predetermined program, to lock through the push rods 11; those rods which it is desired to leave in an inoperative condition so that the corresponding jacks may not be actuated.

According to further modifications, the arrangement may be provided with several central cams acting on as many annular systems of rods controlling the operation of as many groups of five contact-pieces. The annular systems of rods may, in particular, become operative in succession, the contact-pieces a of the rods of a same annular system being inserted in series as already described, while the last contact-piece in each annular system is connected with the first contact-piece of the next annular system.

According to a further modification which is not illustrated, the rods of each annular group may assume an angular position which is angularly shifted with reference to that of the adjacent annular systems, while the corresponding contact-pieces a are again connected in series in sequential arrangement and also from each annular system to the next.

My invention is obviously not limited to the arrangements described and illustrated and, in particular the cam on the smooth surface of which the control rods for the jack-actuating contact-pieces rest may be provided with a projection instead of a notch, as illustrated, so that the rod corresponding to an operative jack may be raised instead of being depressed into a notch as described. Of course, the opening and the closing of the contact-pieces controlled by said rod are adjusted as required by this modification.

Furthermore, although the description has referred solely to the control of jacks, it is obvious that the arrangement illustrated and described may serve for controlling any other operative part, whether electric or purely mechanical for instance.

What I claim is:

1. Remote control apparatus for controlling a plurality of controlled members each operable through a working cycle comprising, a driven cam having a peripheral recess, a motor for driving said cam, a plurality of control elements each biased into engagement with the periphery of said cam, means biasing each of said control elements independently of each other into engagement with said cam, an electric control circuit for controlling said motor comprising a plurality of groups of movable contacts and stationary series contacts, said control elements each having said movable contacts thereon for closing and opening respective ones of said stationary series contacts, said movable contacts on said control elements being disposed for closing a respective group of the series contacts when said control elements are outside of said recess and for opening said respective group of said series contacts when the control element is in said recess, means for energizing said motor when all of the series contacts are all closed, for each control element means comprising an electromagnet in said control circuit for actuating the control element to a position for disengaging it from said recess to a position closing said respective group of series contacts, said control elements being arranged for successively engaging said recess, for each controlled member two pairs of contacts in said circuit in series with said stationary series contacts and each pair operable alternately to a closed condition when the controlled element completes alternate half cycles, means controlled by respective ones of said controlled elements for closing said two pairs of contacts alternately, for each control element other grouped stationary contacts in said circuit and other grouped movable contacts on each of said control elements connected in said circuit and operable to a closed condition when the respective control elements are engaged in said recess and to an open condition when the control elements are disengaged from said recess, control means for each of said controlled members controlled by said other movable and stationary contacts for actuating said controlled members respectively through said half cycles.

2. Remote control apparatus according to claim 1, including for each control element means for locking it in a position in which said control element is disengaged from said recess.

3. Remote control apparatus according to claim 1, including visually indicating means, said other grouped contacts comprising contacts closed by said control elements for controlling energization of said indicating means.

4. Remote control apparatus according to claim 1, said other movable and stationary contacts comprising contacts for controlling energization of said electromagnet when in a closed condition and the individual control elements are in said recess.

5. Control apparatus for controlling a plurality of controlled members each operable through a working cycle comprising, a driven cam having a peripheral recess, a motor for driving said cam, a plurality of control elements each biased into engagement with the periphery of said cam, means biasing each of said control elements independently of each other into engagement with said cam, an electric control circuit for controlling said motor comprising a plurality of groups of movable and stationary series contacts, said control elements each having said movable contacts thereon for closing and opening respective ones of said stationary series contacts, said movable contacts on said control elements being disposed for closing a respective group of the series contacts when said control elements are outside of said recess and for opening said respective group of said series contacts when the control element is in said recess, means for energizing said motor when all of the series contacts are all closed, for each control element means comprising an electromagnet in said control circuit and said cam for actuating the control element to a position for disengaging it from said recess to a position closing said respective group of series contacts, said control elements being arranged for successively engaging said recess, for each controlled member two pairs of contacts in said circuit in series with said stationary series contacts and each pair operable alternately to a closed condition when the controlled element completes alternate half cycles, means controlled by respective ones of said controlled elements for closing said two pairs of contacts alternately, for each control element other grouped stationary contacts in said circuit and other grouped movable contacts on each of said control elements connected in said circuit and operable to a closed condition when the respective control elements are engaged in said recess and to an open condition when the control elements are individually disengaged from said recess, control means for each of said controlled members controlled by said other movable and stationary contacts for actuating said controlled members respectively through said half cycles.

6. Control apparatus according to claim 5, in which said cam is tubular, means in said tubular cam for actuating the control elements to said position for disengaging it from said recess.

7. Remote control apparatus for controlling a plurality of controlled members each operable through a working cycle comprising, a driven cam having a peripheral recess, a motor for driving said cam, a plurality of control elements each biased into engagement with the periphery of said cam, means biasing each of said control elements independently of each other into engagement with said cam, an electric control circuit for controlling said motor comprising a plurality of groups of movable contacts and stationary series contacts, said control elements each having movable contacts thereon for closing and opening respective ones of said stationary series contacts, said movable contacts on said control elements being disposed for closing a respective group of the series contacts when said control elements are outside of said recess and for opening said respective group of said series contacts when the control element is in said recess, means for energizing said motor when all of the series contacts are all closed, for each control element means comprising an electromagnet in said control circuit for actuating the control element to a position for disengaging it from said recess to a position closing said respective group of series contacts, said control elements being arranged for successively engaging said recess, for each controlled member two pairs of contacts in said circuit in series with said stationary series contacts and each pair operable alternately to a closed condition when the controlled element completes alternate half cycles, means controlled by respective ones of said controlled elements for closing said two pairs of contacts alternately, for each control element other grouped stationary contacts in said circuit and other grouped movable contacts on each of said control elements connected in said circuit and operable to a closed condition when the respective control elements are engaged in said recess and to an open condition when the control elements are disengaged from said recess, control means comprising a reversing switch and electromagnets alternately energized for reversing said switch for each of said controlled members controlled by said other movable and stationary contacts for controlling actuation of said controlled members respectively through said half cycles.

No references cited.

LLOYD McCOLLUM, *Primary Examiner.*

S. B. SMITH, W. M. SHOOP, *Assistant Examiners.*